3,202,615
PROCESSES FOR BREAKING PETROLEUM EMULSIONS
Willard H. Kirkpatrick, Sugar Land, and Virgil L. Seale, Houston, Tex., assignors to Valco Chemical Company, Chicago, Ill., a corporation of Delaware
No Drawing. Original application June 8, 1959, Ser. No. 818,563. Divided and this application June 25, 1962, Ser. No. 205,068
8 Claims. (Cl. 252—342)

This application is a divisional application of our co-pending application Serial No. 818,563, filed June 8, 1959, the latter application being a continuation-in-part of our application Serial No. 632,647, filed January 7, 1957, both abandoned.

This invention, in general, relates to the treatment of emulsions of mineral oil and water, such as petroleum emulsions commonly encountered in the production, handling and refining of crude mineral oil for the purpose of separating the oil from the water.

Petroleum emulsions are, in general, of the water-in-oil type wherein the oil acts as a continuous phase for the dispersal of finely-divided particles of naturally occurring waters or brines. These emulsions are often extremely stable and will not resolve on long standing. It is to be understood that water-in-oil emulsions may occur artificially, resulting from any one or more of numerous operations encountered in various industries. The emulsions obtained from producing wells and from the bottom of crude oil storage tanks are commonly referred to as "cut oil," "emulsified oil," "bottom settlings" and "B.S."

One type of process involves subjecting an emulsion of the water-in-oil type to the action of a demulsifying agent of the kind hereinafter described, thereby causing the emulsion to resolve and stratify into its component parts of oil and water or brine after the emulsion has been allowed to stand in a relatively quiescent state.

One object of our invention is to provide a novel and economical process for resolving emulsions of the character referred to into their component parts of oil and water or brine.

Another object is to resolve water-in-petroleum oil emulsions with new compounds which are surface-active at oil-water interfaces in a manner to cause or aid in the breaking of the emulsion.

The treating agents employed in accordance with the present invention consist of compositions of high molecular weight which are organic polycarboxy acid mixed esters of (a) oxyalkylated organic-solvent-soluble phenol-formaldehyde condensation products wherein the phenol reactant is a difunctional, monoalkyl phenol, the alkyl group having between 4 and 15 carbons inclusive, preferably 5–15 carbons, and is in the ortho or para position and (b) polyoxyalkylene glycols having a molecular weight of at least 1200 and usually not greater than 7500. Dialkyl, monofunctional phenols are not suitable for purposes of this invention, but amounts up to 25% dialkyl phenol in monoalkyl phenol may be tolerated. The weight ratio of alkylene oxide to the phenol-formaldehyde condensation product will, for most applications, fall between about 1:2 and 15:1, preferably 1:2 to 9:1, respectively.

The oxyalkylene radicals of the phenol-formaldehyde condensation products consist of both oxyethylene and oxypropylene groups. They may be reacted as a mixture of ethylene oxide and 1,2-propylene oxide to give heterogeneously mixed oxyethylene and oxypropylene groups in the oxyalkylene chains. Alternatively, one of the two oxides may be reacted first with the condensation product, then the other. In this manner the oxyalkylene radicals are composed of polyoxypropylene groups or polyoxyethylene groups attached to the phenolic nuclei of the condensation product and the other oxyalkylene groups attached thereto in terminal positions on the polyoxyalkylene chains.

There is an advantage to having the terminal group of the oxyalkylene chains as an oxyethylene group because the latter has a primary hydroxyl group. A terminal oxypropylene group, on the other hand, has a secondary hydroxyl group, which is more difficult to sulfate or esterify with the carboxy acids than the primary hydroxyl group. Simultaneous reaction of a mixture of both ethylene and propylene oxide probably gives an oxyalkylated product having both types of terminal hydroxyl groups.

The polyoxyalkylene glycols may be either polyoxypropylene glycol or a mixed oxide glycol of propylene oxide and ethylene oxide where the weight ratio of oxyethylene to oxypropylene does not exceed 4:1. The weight ratio of the oxyethylated phenol-formaldehyde condensation product to polyoxyalkylene glycol in the resulting mixed esters of the polycarboxy acid should be 1:5 to 5:1, and preferably about 1:4 to 4:1.

PHENOL-FORMALDEHYDE CONDENSATION

The phenol-formaldehyde condensation products are prepared by reacting formaldehyde or a substance which breaks down to formaldehyde under the reaction conditions, e.g., para-formaldehyde and trioxane, and a difunctional monoalkyl phenol, by heating the reactants in the presence of a small amount of an acid catalyst such as sulfamic acid under substantially anhydrous conditions— excepting the water produced during the reaction. The aqueous distillate which begins to form is collected and removed from the reaction mixture. After several hours of heating at temperatures slightly above the boiling point of water, the mass becomes viscous and is permitted to cool to about 100 to 105° C. At this point a suitable hydrocarbon fraction is added, and heating is resumed. Further aqueous distillate begins to form and heating is continued for an additional number of hours until at least about one mol of aqueous distillate per mol of reactants has been secured. The product is permitted to cool to yield the phenol-formaldehyde condensation product in a hydrocarbon solvent. The molecular weight of these intermediate condensation products cannot be ascertained with certainty, but we would approximate that the resins employed herein should contain about 4 to 15, preferably 4 to 10, phenolic nuclei per resin molecule. The solubility of the condensation product in hydrocarbon solvents such as $SO_2$ extract would indicate that the resins are linear type polymers, thus distinguishing them from the more common phenol-formaldehyde resins of the cross-linked type.

The phenol component of our phenol-formaldehyde resins is entirely or principally a difunctional phenol— one having only two of the three normally reactive ortho- and para- positions available for reaction with the formaldehyde. These phenols are mono-alkyl phenols with the alkyl group in the para- or ortho- position having up to about 15 carbons. Phenols suitable for our invention are difunctional, mono-alkyl phenols having straight chain or branch chain alkyl groups of 4–15 carbons, preferably 5–15 carbons. Examples of the phenolic component include such preferred phenols as p-n-butyl phenol, p-tertiary butyl phenol, p-amyl phenol, p-tertiary hexyl phenol, p-tertiary octyl (1,1,3,3-tetramethyl butyl-1) phenol, p-nonyl phenol, p-dodecyl phenol, a crude alkyl phenol containing at least about 90% p-nonyl phenol and up to 10% dinonyl phenol, and others including mixtures of ortho- and/or para-monoalkyl phenols and crude alkylate phenols containing at least 75% difunctional alkyl phenols with the remainder being primarily monofunctional phenols.

This aspect of the invention is illustrated in the following examples but is not limited thereto. The parts are by weight.

*Example A*

In a three-necked reaction flask provided with means of mechanical stirring and a return condenser system permitting the removal of any aqueous phase formed in the course of reaction, there is added 1500 parts of a crude alkylate phenol which comprises about 90% of an undistilled p-nonyl phenol containing approximately 10% of dinonylphenol, 225 parts paraformaldehyde and 3 parts sulfamic acid which is present as a catalyst in the reaction. The reaction mass is heated, and at 108° C. an aqueous distillate begins to form. After three hours heating at approximately 110° C. the mass becomes quite viscous and is permitted to cool to about 100° C. At this point 600 parts of $SO_2$ extract is added, and heating is resumed. Again at 110° C. further aqueous distillate begins to form, and heating is continued for an additional three hours, or until approximately 141 cc. of aqueous distillate has been secured at a maximum temperature of 212° C. The product is permitted to cool to yield the finished phenol-formaldehyde resin in the hydrocarbon solvent.

*Example B*

In a manner similar to Example A, 1000 parts of the crude alkylate phenol, 120 parts of paraformaldehyde and 2 parts sulfamic acid were heated 2 hours at 105–110° C. to permit reaction of the phenol and formaldehyde under conditions minimizing formaldehyde loss. At temperatures above 110° C. vigorous reaction sets in which must be controlled by cooling. After about 27 parts of aqueous distillate have been secured, the reaction comes under control and becomes exceedingly viscous. At this point the resin is cooled to 105° C., and 400 parts of $SO_2$ extract is added. Heating is continued for an additional three hours, or until a total of about 75 parts of aqueous distillate have been removed at maximum temperature of 212° C. to yield the finished phenol-formaldehyde resin in the hydrocarbon solvent.

*Example C*

In a manner similar to Examples A and B, 1000 parts of the crude alkylate phenol, 90 parts paraformaldehyde and 2 parts sulfamic acid are carefully reacted at temperatures of 100–110° C. When the reaction mass becomes quite viscous, the reaction is permitted to cool, and 400 parts of $SO_2$ extract are added. Heating is resumed for an additional hour, or until a total of 55 parts of aqueous distillate have been secured at maximum temperature of 213° C. to yield the finished phenol-formaldehyde resin in the hydrocarbon solvent.

*Example D*

In a reaction vessel provided with a stirrer and a return condenser system providing for the removal of water distilled over in the course of the reaction, p-amyl phenol is heated to the melting point (about 90° C.). To 5000 parts of the melted p-amyl phenol is added 10 parts of hydrochloric acid and 20 parts of oxalic acid. Then 1100 parts of paraformaldehyde is added in small proportions while maintaining the temperature at 90–100° C. Upon completion of paraformaldehyde addition, the reaction mixture is held at 95° C. for two hours whereupon 750 parts of $SO_2$ extract is added to reduce the viscosity. The temperature is raised slowly to remove approximately 610 parts of aqueous distillate at a final maximum temperature of 230° C.

The reaction mass is thereafter held at 210° C. for one hour and then cooled to 200° C. It is then blended with 3600 parts of $SO_2$ extract.

*Example E*

The procedure of Example D is repeated with the substitution of p-tertiary butyl phenol for the p-amyl phenol.

In the preceding examples, sulfamic acid has been used as the acid catalyst to assist in the condensation reaction. Other suitable equivalent acids which may be used in place of sulfamic acid are mineral acids such as sulfuric acid, hydrochloric acid, phosphoric acid, etc.

As stated heretofore, intermediate phenol-formaldehyde resin should contain a minimum of about 4 phenolic nuclei and should not exceed about 15 phenolic nuclei. It is extremely difficult, if not impossible, to accurately determine the molecular weight of the intermediate resin products. However, it is believed that the resin of Example A contains about 10 phenolic nuclei per resin molecule, Example B, about 7 phenolic nuclei, and Example C, about 4 phenolic nuclei per resin molecule.

OXYALKYLATION OF THE CONDENSATION PRODUCTS

Having prepared the intermediate phenol-formaldehyde products, the next step is the oxyalkylation of the condensation products at the —OH group of the phenolic nuclei. This is achieved by mixing the intermediate phenol-formaldehyde condensation product in a hydrocarbon solvent with a small amount of a suitable catalyst in an autoclave. The condensation product is heated above 100° C., and both ethylene oxide and propylene oxide, either as a mixture or by sequential addition of first the propylene oxide and then the ethylene oxide, or vice versa, are charged into the autoclave until the pressure is in the vicinity of 75–100 p.s.i.

The reaction mixture is gradually heated until an exothermic reaction begins. The external heating is then removed, and alkylene oxide is added at such a rate that the temperature is maintained between about 150–160° C. in a pressure range of 80 to 100 p.s.i. After all of the alkylene oxide has been added, the temperature is maintained for an additional 10 to 20 minutes to assure substantially complete reaction of the alkylene oxide. The resulting product is the alkylene oxide adduct of an alkyl phenol-formaldehyde condensation product, in which the weight ratio of the oxide to the condensation product is between about 1:2 and 15:1, respectively, preferably 1:2 to 9:1. The molecular weight of the oxyalkylated phenol-formaldehyde condensation products of this invention range from as low as about 1100 to as high as about 50,000. The weight ratio of oxyethylene to oxypropylene groups in the oxyalkylated phenol-formaldehyde resins will ordinarily be between about 4:1 and 1:25, respectively.

Some preferred embodiments of the oxyalkylated, alkyl phenol-formaldehyde condensation products and methods of their preparation are illustrated in the following examples wherein all parts are by weight unless otherwise stated, but the invention is not limited thereto.

*Example F*

In an autoclave having a two-liter capacity equipped with means of external electrical heating, internal cooling coils and mechanical agitation, there is charged 18 parts of the resin solution of Example B and 1.5 parts of sodium hydroxide. Into a transfer bomb there is introduced 23 parts of mixed oxides prepared by mixing equal parts of ethylene and propylene oxide by weight. The intermediate is heated to 135° C. and the oxide mixture is charged into the reactor until reactor pressure is 80 p.s.i. The reaction mixture is gradually heated until an exothermic reaction begins to take place. The external heating is removed and the mixed oxides are then added at such a rate that the temperature is maintained between 150–160° C. with a pressure range of 80 to 100 p.s.i. At various stages in the reaction small samples of the reaction product were removed. After approximately 2 hours all of the oxide has been added to the autoclave and the temperature is maintained for an additional period of time so that the reactor pressure drops to a constant value. This may require from 15 minutes to 2 hours to make certain that the unreacted oxide is reduced to a minimum. The resultant product is the mixed oxide adduct of a phenol-formaldehyde resin in which the ratio of oxide to resin by weight is 4 to 1.

*Example G*

In a manner similar to Example F a mixed oxide adduct of the resin of Example A was prepared in which the ratio of ethylene oxide to propylene oxide was 1 part to 2 parts. The finished product is an oxyalkylated resin in which the ratio of mixed oxides to resin is 4 to 1.

*Example H*

In the same facilities as used in Example F, there is charged 172 parts of the resin solution of Example A and 1 part of sodium hydroxide. Into a transfer bomb there is introduced 250 parts by weight of ethylene oxide and 250 parts of propylene oxide. The intermediate is heated to 135° C. and the mixed oxides are charged into the reactor until the reactor pressure is 80 p.s.i. The reaction conditions from here on were identical with those employed in Example F. The resulting product is the mixed oxide adduct of a phenol-formaldehyde resin in which the ratio of oxide to resin by weight is approximately 4 to 1.

*Example J*

In a manner similar to Example H, using a 1 to 1 by weight ratio of ethylene oxide and propylene oxide, a mixed oxide adduct of the resin of Example C was prepared in which the ratio of oxide to resin was 6 to 1.

*Example K*

In a manner similar to Example H, using a 1 to 3 by weight ratio of ethylene oxide to propylene oxide, a mixed oxide adduct of the resin of Example C was prepared in which the ratio of oxide to resin was 6 to 1.

*Example L*

In a manner similar to Example H, using a 1 to 3 by weight ratio of ethylene oxide to propylene oxide, a mixed oxide adduct of the resin of Example B was prepared in which the ratio of oxide to resin was 2 to 1.

*Example M*

In a manner similar to Example H, using a 3 to 1 by weight of ethylene oxide to propylene oxide, a mixed oxide adduct of the resin of Example A was prepared in which the ratio of oxide to resin was 1 to 1.

*Example N*

In a manner similar to Example H, there is prepared a propylene oxide adduct of the resin of Example A in which the ratio of propylene oxide to resin by weight is 1 to 1. The oxypropylated phenol-formaldehyde resin was then reacted further with ethylene oxide until the finished product contained 10% by weight of ethylene oxide.

*Example O*

In a manner similar to Example N, a propylene oxide adduct of the resin of Example C was prepared in which the ratio of propylene oxide to resin was 6 to 1 by weight. Ethylene oxide was then added to this oxypropylated phenol-formaldehyde resin until the finished product contained 20% by weight of ethylene oxide.

*Example P*

In a manner similar to Example N, a propylene oxide adduct of the resin of Example A was prepared in which the ratio of propylene oxide to resin was 9 to 1 by weight. This oxypropylated phenol-formaldehyde resin was then further reacted with ethylene oxide until the finished material contained 5% by weight of ethylene oxide.

*Example Q*

In a manner similar to Example N, a propylene oxide adduct of the resin of Example C was prepared in which the ratio of propylene oxide to resin was 2 to 1 by weight. This oxypropylated phenol-formaldehyde resin was then further reacted with ethylene oxide until the finished material contained 30% by weight of ethylene oxide.

*Example R*

Into the gas charge vessel of an oxyalkylation unit is charged 250 parts of ethylene oxide and 250 parts of propylene oxide. The gases are circulated via a circulating pump to mix them thoroughly. Then 2000 parts of the phenol-formaldehyde resin solution of Example D and 3.8 parts of sodium hydroxide are charged into the oxyalkylation. The reactor is purged with natural gas. The mixed oxides are added at 150–160° C. The oxyalkylation is completed at this temperature and a pressure of 80–100 p.s.i. The gases are recycled in the unit for two hours after the addition of oxides is complete. The resulting product is oxyalklation product of the phenol-formaldehyde resin wherein the oxyethylene and oxypropylene groups are mixed heterogeneously in the oxyalkylene adduct radicals.

*Example S*

In a manner similar to Example R, 7200 parts of the resin solution of Example D and 1800 parts of an ethylene oxide-propylene oxide mixture (2 parts by weight propylene oxide per part ethylene oxide) are reacted in the presence of 13 parts of sodium hydroxide.

*Example T*

The mixed oxyethylene and oxypropylene adduct of the phenol-formaldehyde resin of Example E is prepared by substituting the resin solution of Example E for the resin solution of Example D in the procedure of Example S.

In using mixtures of the oxides in the oxyalkylation, it is preferred that the weight ratio of ethylene oxide to propylene oxide be between 1:4 and 4:1. A considerably lower ratio of ethylene oxide to propylene oxide to about 1:25 may be employed where the oxides are added sequentially in the manner heretofore described—as evidenced by Example P.

ESTERIFICATION OF OXYALKYLATED CONDENSATION PRODUCTS AND POLYALKYLENE GLYCOLS WITH POLYBASIC ACIDS

The next and final step in the preparation of the compositions of our invention is the esterification of an organic, polycarboxy acid, or in some instances the anhydride thereof, with the oxyalkylated phenol-formaldehyde condensation products previously described and polyoxyalkylene glycols having a molecular weight of at least 1200 and not more than about 7500. The ratio of the oxyalkylated condensation product to the polyoxyalkylene glycol preferably ranges from 1:5 to 5:1. The polyoxyalkylene glycol may be either polyoxypropylene glycol or an oxyethylene, oxypropylene glycol wherein the weight ratio of oxyethylene to oxypropylene does not exceed 4:1. In most cases the esterification reaction should be carried out by sequentially adding first the polyoxyalkylene glycol and then the oxyalkylated phenol-formaldehyde condensation product. The polycarboxy acid and polyalkylene glycol are heated until an aqueous distillate begins to form. Heating is continued until sufficient aqueous distillate has been secured to indicate that the esterification is complete. The mass is then cooled to about 150° C. at which point the oxyalkylated phenol-formaldehyde condensation product is added. Heating is then resumed and continued until sufficient aqueous distillate has been secured to indicate completion of the esterification. After cooling, a suitable hydrocarbon fraction is added to yield the polycarboxy acid mixed ester of the polyoxyalkylene glycol and the oxyalkylated phenol-formaldehyde condensation product in a hydrocarbon carrier.

The dicarboxy acids are aliphatic, cycloaliphatic or aromatic polycarboxy acids. In some instances, we prefer dicarboxy acids having 2–10 carbons, and in other instances acids, e.g., dimer acids having at least 36 carbons, such as dimerized abietic acid, dimerized linoleic acid, dimerized linolenic acid, etc., are employed. Polycarboxy acids or anhydrides thereof which may be used in the esters of our invention include oxalic, maleic, malonic, succinnic, diglycolic, adipic, azelaic, sebacic, fumaric, tartronic, malic, camphoric, tartaric, phthalic, and terephthalic acids or anhydrides, VR–1 polymeric acid, dimerized abietic acid, dimerized linoleic and/or dimerized linolenic acid, among others.

Emery dimer acid is essentially dilinoleic acid and is a polymer made by polymerizing an unsaturated fatty acid containing at least two nonconjugated double bonds. Such acids may also be described as polymer drying oil acids. The term "drying oil acid" is used herein to mean an unsaturated fatty acid containing at least two double bonds and at least six carbon atoms. The polymer acids employed for the purpose of the invention preferably consist predominantly of dimer acids but may contain trimers and higher polymers. The preferred polymer acids are those containing 12 to 40 carbon atoms and especially the polymers of the drying oil acids of the linoleic acid series, including, for example, the polymers of sorbic acid, geranic acid, palmitolic acid, linoleic acid and humoceric acid. It will be understood that these polymers may include cogeneric mixtures of polycarboxy acids.

A number of these polymer acids are available as by-product materials. Thus, one source of the polymeric acids suitable for the purposes of this invention is the still residue of the dry distillation of castor oil in the presence of sodium hydroxide. VR–1 acid is an acid of this type.

VR–1 acid is a mixture of polybasic acids, with an average molecular weight of about 1,000. It has an average of slightly more than two carboxylic acid groups per molecule. It is a by-product acid, and is a dark amber, rather viscous liquid. A typical sample of VR–1 acid gave the following analysis.

Acid number _____ 150
Iodine number _____ 36
Saponification number _____ 172
Unsaponifiable matter _____percent__ 3.7, 3.5
Moisture content _____do____ 0.86

It should be noted that it is preferred to carry out the esterification reaction step-wise. In this manner, products of the desired molecular weights and physical properties are formed consistently without the formation of undesirable insoluble polymers or materials which have too high a molecular weight or viscosity by virtue of excessive cross-linking. The fluid properties of the esters of this invention appear to be a definite factor in their properties as emulsion-breaking agents. In some instances simultaneous reaction of the oxyalkylated condensation product and the polyoxyalkylene glycol is permissible, but experimentation is essential in order to avoid formation of infusible, insoluble resinous esters. The ratio of dicarboxy acid may be such as to provide a finished product essentially free of unreacted carboxyl groups or a finished product which contains a high percentage of unreacted carboxyl groups. The esters are composed 1 to 2 mols of the dicarboxy acid for each mol of total mols of the oxyalkylated phenol-formaldehyde resin and the polyoxypropylene glycol.

The dicarboxy acid esters of this invention are essentially water insoluble. This property is important in the emulsion breaking properties of our compositions. For purposes herein, the esters of the character herein described are considered to be water insoluble when, at equilibrium with distilled water at 70° F., not more than 2 parts by weight dissolve per 100 parts of water. Water insolubility of our esters is increased as the proportions of the oxypropylene groups with respect to the oxyethylene groups in the oxyalkylated phenol-formaldehyde resins and in the polyoxyalkylene glycols becomes greater. Also, higher molecular weight fatty acids, such as dimerized acids having at least 36 carbons, lessen water solubility as compared to other dicarboxy acids, heretofore mentioned, having 2–10 carbons. In all cases, our esters have sufficient hydrophobic constituents to make the final product insoluble in water within the previous definition.

The invention will be further understood from the following examples wherein the parts are by weight unless otherwise indicated.

*Example I*

In a three-necked reaction flask provided with means of mechanical stirring and heating, there is added 300 parts by weight of a polyglycol prepared by adding 6 mols of ethylene oxide terminally to a polypropylene glycol of 2700 molecular weight. Forty parts of diglycolic acid and 50 parts by weight of a suitable hydrocarbon extract is also added. These materials were heated to remove 5.2 parts of aqueous distillate over a period of about 1 hour. The reaction mass was then cooled to 150° C. Two hundred parts by weight of oxyalkylated resin of Example F was added, and heat was again applied to remove aqueous distillate in the amount of 2.3 parts. In both processing steps the material was heated to a temperature in the range of 265–270° C. as a maximum final temperature. After the second heating period the material was cooled, and 360 parts by weight of a suitable hydrocarbon extract was added to yield the finished product.

*Example II*

In a manner similar to Example I, 200 parts of oxyalkylated resin of Example I was substituted for oxyalkylated resin of Example F.

*Example III*

In a manner similar to Example I, 200 parts of the oxyalkylated resin of Example G was substituted for the 200 parts of oxyalkylated resin of Example F.

*Example IV*

In a three-necked reaction flask provided with means of mechanical stirring and heating, there is added 400 parts of polypropylene glycol 2000, 55 parts diglycolic acid and 50 parts of a suitable hydrocarbon extract. These materials were heated to remove approximately 7.5 parts of aqueous distillate at a maximum final temperature of 270° C. The reaction mass was then cooled to 150° C., and 100 parts of the oxyalkylated resin of Example H was added. These materials were then further processed to remove 2 parts of aqueous distillate with a maximum final temperature of 265° C. The material was cooled, and 350 parts of a suitable hydrocarbon extract is added to yield the finished product.

*Example V*

In a three-necked flask provided with means of mechanical stirring and heating, there is added 400 parts of a polyglycol prepared by adding 4 moles of ethylene oxide terminally to a mole of polypropylene glycol 2000. To this material 45 grams of maleic anhydride and 2 grams of diglycolic acid are added. These materials are heated together for a period of 6 hours at 140–150° C. At the end of this period of heating, 100 parts by weight of the oxyalkylated resin of Example J was added, and the temperature was raised to remove approximately 2 parts of aqueous distillate with a maximum final temperature of 265° C. The material was then cooled, and 360 parts of a suitable hydrocarbon extract was added to give the finished product.

The use of a small amount of diglycolic acid to neutralize the catalyst as the insoluble sodium diglycollate has been found exceedingly important in reactions where maleic acid or maleic anhydride is used as the dibasic acid. Apparently the presence of small amounts of alkaline catalyst resulting from the production of high molecular weight polyglycols gives rise to said reactions apparently involving the formation of derivatives of maleic acid. Alkaline catalysts are known to favor the addition of alcohols across the maleic anhydride double bond, particularly in cases where the alcohol group is of primary configuration. This reaction is objectionable for the reason that maleic acid derivatives function as cross-linking agents and under certain processing conditions, particularly those involving long periods of heating at high temperatures, tend to favor the formation of rubbery, oil insoluble polymers.

*Example VI*

In a three-necked reaction flask provided with means of mechanical stirring and heating, there is added 400 parts of a polyglycol produced by adding 8 moles of ethylene oxide terminally to a polypropylene glycol of 2000 molecular weight. Sixty grams phthalic anhydride are added, and the materials heated together for a period of 8 hours at a temperature of 145–155° C. At the end of this time 100 parts of the oxyalkylated resin of Example K was added, and the material was further heated to remove 3.5 parts of aqueous distillate with a maximum final temperature of 270° C. The material was cooled, and 360 parts of a suitable hydrocarbon extract were added to give the finished product.

*Example VII*

In a three-necked reaction flask provided with means of mechanical stirring and heating, there is added 300 parts of a heteric mixed oxide polyglycol of 3000 molecuar weight wherein the ratio of ethylene oxide to propylene oxide is 1 to 3. Forty grams of diglycolic acid and 50 parts of a suitable hydrocarbon extract are added, and the above materials heated to remove aqueous distillate in the amount of 5 parts at a maximum final tempereature of 265° C. At this point the material was cooled to 150° C. and 200 parts of the oxyalkylated resin of Example E was added. The reaction mass was further heated to remove 2.5 parts of aqueous distillate at maximum final temperature of 270° C. The material was then cooled, and 260 parts of a suitable hydrocarbon extract was added to give the final product.

*Example VIII*

In a three-necked reaction flask provided with means of mechanical stirring and heating, there is added 250 parts by weight of the polyglycol prepared by adding 6 moles of ethylene oxide terminally to a polypropylene glycol of 2700 molecular weight, 30 parts of diglycolic acid and 50 parts of a suitable hydrocarbon extract. The materials are then heated to remove approximately 4.5 parts of aqueous distillate with a maximum final temperature of 260° C. At this point the material is cooled, and 250 parts of the oxyalkylated resin of Example L are added. The materials are heated further to remove one and one-half parts of an aqueous distillate with a maximum final temperature of 260° C. The material is cooled, and 375 parts of a suitable hydrocarbon extract is added to give the finished product.

*Example IX*

In a three-necked reaction flask provided with means of mechanical stirring and heating, there is added 1200 parts by weight of a polyglycol prepared by adding 6 moles of ethylene oxide terminally to a mole of polypropylene glycol 2700, 120 grams diglycolic acid and 150 grams of a suitable hydrocarbon extract. The materials are heated to remove 17 parts of an aqueous distillate with a maximum final temperature of 265° C.

Then, 366 parts of the above intermediate and 110 parts of the oxyalkylated resin of Example L are heated to remove 1.2 parts of aqueous distillate with a maximum final temperature of 270° C. Four hundred parts of a suitable hydrocarbon extract is added to give the finished product.

*Example X*

In a manner similar to Example IX, 244 parts of the intermediate of Example IX and 200 parts of the oxyalkylated resin of Example L were heated together to remove one and one-half parts of aqueous distillate with a maximum final temperature of 260° C. After cooling, 375 parts of a suitable hydrocarbon extract was added to give the finished product.

*Example XI*

In a manner similar to Example IX, 122 parts of the intermediate of Example IX and 300 parts of the oxyalkylated resin of Example L were heated to remove one part of aqueous distillate with a maximum final temperature of 265° C. After cooling, 375 parts of a suitable hydrocarbon extract was added to give the finished product.

*Example XII*

In a three-necked reaction flask provided with means of mechanical stirring and heating, there is added 300 parts of a polypropylene glycol of 3000 molecular weight. Forty grams of diglycolic acid and 50 grams of a suitable hydrocarbon extract are added, and the material heated to remove 7 parts of aqueous distillate with a maximum final temperature of 270° C. The material was then cooled to 150° C., and 200 parts of the oxyalkylated resin of Example M was added. The material was then heated to remove 2 parts of aqueous distillate at a maximum final temperature of 270° C. After cooling, 375 parts of a suitable hydrocarbon extract was added to give the finished product.

*Example XIII*

In a manner similar to Example XII, 200 parts of the oxyalkylated resin of Example N was substituted for the 200 parts of the oxyalkylated resin of Example M.

*Example XIV*

In a manner similar to Example XII, 200 parts of the oxyalkylated resin of Example O was substituted for the 200 parts of the oxyalkylated resin of Example M.

*Example XV*

There is charged in a Dowtherm vessel 8000 lbs. of polypropylene glycol (mol. wgt. 2700) to which has been added by oxyethylation 6 mols of ethylene oxide, 1050 lbs. of diglycolic acid, and 180 gallons of $SO_2$ extract. The mixture is heated until 18 gallons of aqueous distillate are recovered with a maximum final temperature of about 270° C. The batch is held at 265–270° C. for about one-half hour and is then cooled to 200° C. The cooled product is blended uniformly with 220 gallons of $SO_2$ extract.

Then 1800 lbs. of this product is mixed with 5400 lbs. of the product of Example R and 20 gallons of $SO_2$ extract. They are heated to about 190° C. over a period of about two hours and held at 190–200° C. for another hour. The temperature is then slowly raised to 260° C. and 4 to 4.5 gallons of aqueous distillate is distilled off and collected. The reactants are held at 255–260° C. for one-half hour. The product is cooled to 200° C. and blended with 900 gallons (6750 lbs.) of $SO_2$ extract. The product is then filtered at about 90° C.

Example XVI

There is charged in a Dowtherm vessel 8000 lbs. of polypropylene glycol (mol. wgt. 2700) to which has been added by oxyethylation 6 mols of ethylene oxide, 1050 lbs. of diglycolic acid, and 180 gallons of $SO_2$ extract. The mixture is heated until 18 gallons of aqueous distillate are recovered with a maximum final temperature of about 270° C. The batch is held at 265–270° C. for about one-half hour and is then cooled to 200° C. The cooled product is blended uniformly with 220 gallons of $SO_2$ extract.

Then 1800 lbs. of this product is mixed with 5400 lbs. of the product of Example S and 20 gallons of $SO_2$ extract. They are heated to about 190° C. over a period of about two hours and held at 190–200° C. for another hour. The temperature is then slowly raised to 255° C. and 4 to 4.5 gallons of aqueous distillate is distilled off and collected. The reactants are held at 255–260° C. for one-half hour. The product is cooled to 200° C. and blended with 910 gallons of $SO_2$ extract. The product is then filtered at about 90° C.

Example XVII

There is charged in a Dowtherm vessel 8000 lbs. of polypropylene glycol (mol. wgt. 2700) to which has been added by oxyethylation 6 mols of ethylene oxide, 1050 lbs. of diglycolic acid, and 180 gallons of $SO_2$ extract. The mixture is heated until 18 gallons of aqueous distillate are recovered with a maximum final temperature of about 270° C. The batch is held at 265–270° C. for about one-half hour and is then cooled to 200° C. The cooled product is blended uniformly with 220 gallons of $SO_2$ extract.

Then 1800 lbs. of this product is mixed with 5400 lbs. of the product of Example T and 20 gallons of $SO_2$ extract. They are heated to about 190° C. over a period of about two hours and held at 190–200° C. for another hour. The temperature is then slowly raised to 255° C. and 3 to 3.5 gallons of aqueous distillate is distilled off and collected. The reactants are held at 255–260° C. for one-half hour. The product is cooled to 200° C. and blended with 910 gallons of $SO_2$ extract. The product is then filtered at about 90° C.

Among the suitable hydrocarbon vehicles which can be employed as diluents and reaction solvents is sulfur dioxide extract. This material is a by-product from the Edeleanu process of refining petroleum in which the undesirable fractions are removed by extraction with liquid sulfur dioxide. After removal of the sulfur dioxide a mixture of hydrocarbon, substantially aromatic in character, remains and is designated in the trade as sulfur dioxide extract or $SO_2$ extract. Examples of other suitable hydrocarbon vehicles and solvents are toluene, xylene, gas oil, diesel fuel, bunker fuel and coal tar solvents. The above cited examples of solvents are adaptable to azeotropic distillation as would also be any other solvent which is immiscible with water, miscible with the reacting mass and has a boiling point or boiling range in excess of the boiling point of water.

DEMULSIFICATION

The compositions of this invention are surface-active and are particularly suitable for the demulsification of crude oil emulsions. Demulsification is achieved by mixing the demulsifying agents of this invention, at a ratio in the approximate range of one part of the demulsifying agent to 2,000–50,000 parts of the emulsion, and thereafter allowing the emulsion to remain in a relatively quiescent state during which separation of the oil and water occurs. The demulsifying agents of this invention may be used in conjunction with other demulsifying agents from classes such as the petroleum sulfonate type, of which naphthalene sulfonic acid is an example, the modified fatty acid type, the amine modified oxyalkylated phenol-formaldehyde type, and others.

The effectiveness of the compositions of this invention as demulsifying agents is illustrated in the following tests and data.

BOTTLE TESTING OF CRUDE OIL EMULSIONS

The bottle testing of crude oil emulsions is conducted according to the following procedure: fresh samples of the emulsion-breaking chemicals in organic solvents solution are prepared in 10% solutions. These solutions are made by accurately diluting 10 milliliters of the emulsion-breaking chemicals in 90 milliliters of a mixture of equal parts of anhydrous isopropyl alcohol and an aromatic hydrocarbon such as xylene. The mixture is agitated well until the emulsion-breaking chemical is completely dissolved.

The equipment for running the crude oil emulsion-breaking test, in addition to the foregoing 10% solutions, includes a set of six ounces graduated prescription bottles, a funnel, a graduated 0.2 milliliter pipette, a thief pipette, a centrifuge, centrifuge tubes and a thermometer. The graduated prescription bottles are filled to the 100 milliliter mark with the crude oil emulsion to be tested, preferably a sample which has been recently collected. If there is any free water in the crude oil emulsion sample collected, it is bled off before the bottles are filled. Each bottle is inverted several times with the thumb over the opening of each bottle so that the bottle will be coated with an emulsion film.

By means of the 0.3 milliliter pipette, the prescribed volume of the 10% solution of the emulsion-breaking chemical is added to the emulsion in the bottles. The bottles are then capped and given manual agitation for a predetermined number of counts. The number of counts are determined by a survey of the agitation which can be secured in the system in which the crude oil emulsion is being used. If the emulsion requires heat for treatment, the bottles are placed in hot water bath, the length of time and temperature determined by the particular plant equipment and practice in which the particular emulsion is employed. If the plant provides for hot agitation of the emulsion the bottles may be given a corresponding amount of manual hot agitation.

The bottles are then removed from the hot water bath and the water drop, presence of the bottom settlings (B.S.) layer and color and general appearance of the oil are noted.

A thief grind-out is taken on all bottles which appear to be promising. A thief grind-out is made by preparing centrifuge tubes filled with gasoline to the 50% mark. The thief pipette is set to the proper length by adjusting the rubber stopper so that the bottom of the pipette is about ¼ inch above the oil-water level of the bottle with maximum water drop. This same setting is used for all subsequent thiefings or remaining bottles. The thiefed oil from each bottle is added to the centrifuge tube to the 100% mark, and the tube is shaken. The samples are then centrifuged for three minutes.

With certain paraffin base oils a portion of the paraffin is thrown down with the B.S. If the centrifuge tubes are heated to 150° F. the paraffin will melt and be dissolved in the gasoline-oil mixture and usually will not be thrown down again with the B.S. upon centrifuging while hot. However, occasionally the paraffin will re-congeal as the tube cools during centrifuging. If this occurs, the tube is removed from the centrifuge and heated to 150° F. without shaking or disturbing the settled B.S. layer. The sample is then centrifuged for 15 seconds. This should give a true B.S. reading free of paraffin.

An excess chemical grind-out is then run on each centrifuge by adding several drops of a 20% solution in white gasoline or other solvent of a chemical which causes complete separation of the water and oil. With some sensitive emulsions the chemical will cause reemulsification. In these instances it is necessary to rethief and add a lesser amount. Each tube is vigorously shaken to make sure that the packed B.S. layer is broken up and the tubes heated to 150° F. in the case of troublesome paraffin base crude oil. The samples are then centrifuged for three minutes.

During the test the speed of the water drop is observed carefully after the emulsion-breaking chemical is added to the prescription bottles. The observation of the color and brilliance of the oil in transmitted light is very important. In general, the brilliance and depth of color increases with a decrease in B.S. & W. (bottom settlings and water) content. The observations of color are made in the oil in the prescription bottles before and after heat treatment. In the ideal treatment of crude oil emulsions the oil-water line could be a sharp, clean line without any web or sludge present. Presence of a considerable amount of sludge or web is undesirable because this foreign material will eventually go to stock in the treating plant and be reported as B.S. Trades of web or sludge, however, will disappear or be removed in the normal treating plant.

In almost all instances the thief grind-out and excess chemical grind-out readings indicate the formula that has most nearly produced crude oil free from B.S. and water. The most efficient emulsion-breaking chemical is determined by the foregoing test procedure by the overall consideration of the following factors: relative speed of the breaking of the emulsion which is usually indicated by speed of water drop, color and brilliance of the oil layer, the relative absence of web or sludge at oil-water line and the ability to most nearly produce treated oil that is free from B.S. and water.

By way of illustrating the effectiveness of the emulsion-breaking chemicals contemplated by this invention the composition of Example I was tested according to the foregoing bottle testing procedure on samples of 24 gravity crude oil obtained from Esperson Dome Field, Texas. The crude oil emulsion contained about 56% water. The commercial treating chemical being used on the lease and the treating chemical of Example I were both tested for comparative purposes. These treating chemicals were added at a ratio of 0.06 part of a 10% solution, as described in the foregoing procedure, to 100 parts of the emulsion fluid. The samples were given 150 shakes cold and 50 shakes hot, the hot temperature being 120° F. The observations made during the tests were recorded and are summarized in the following table.

TABLE I

| Treating Chemical | Water Drop | | Thief Grind-out | | Excess Grind-Out | |
|---|---|---|---|---|---|---|
| | 30 min. | 80 min. | B.S. | Water | B.S. | Water |
| Commercial Chemical | 20 | 49 | 0 | 8.5 | 0 | 9.2 |
| Example I | 48 | 56 | 0 | 2.6 | 0 | 2.6 |

Similar tests were made on a crude oil emulsion containing about 42% water of a 24 gravity crude oil from a lease in Esperson Dome Field. The treating chemicals tested included the commercial demulsifying agent being used on the lease in addition to the treating compositions of Examples I and III at a ratio of 0.02 part of a 10% solution of the treating chemical to 100 parts of the emulsion fluid. The samples were given 150 cold shakes and 50 hot shakes, the hot temperature being 120° F. A summary of the observations made during the test appears in the following table.

TABLE II

| Treating Chemical | Water Drop | | | Thief Grind-Out | | Excess Grind-Out | |
|---|---|---|---|---|---|---|---|
| | Cold 15 min. | Hot (to 170° F.) | Hot 120 min. | B.S. | Water | B.S. | Water |
| Commercial Chemical | 5 | 21 | 34 | 0 | 13.0 | 0 | 14.0 |
| Example I | 27 | 32 | 39 | 0 | 4.0 | 0 | 4.4 |
| Example III | 22 | 30 | 40 | 0 | 4.8 | 0 | 5.5 |

Other similar tests were made on a crude oil emulsion containing about 56% water of a 28 gravity crude oil from Spivey Field, Kansas. The treating chemicals tested were the commercial demulsifying agent being used on the lease in addition to the treating composition of Example I at a ratio of 0.06 part of a 10% solution of the testing chemical to 100 parts of the emulsion fluid. The samples were given 150 cold shakes and 50 hot shakes, the hot temperature being 170° F. A summary of the observations made during the test appears in the following table.

TABLE III

| Treating Chemical | Water Drop | | Thief Grind-Out | | Excess Grind-Out | |
|---|---|---|---|---|---|---|
| | 15 min. (to 170° F.) | 60 min. | B.S. | Water | B.S. | Water |
| Commercial Chemical | 14 | 42 | 5.8 | 0.2 | 0 | 5.6 |
| Example III | 41 | 50 | 0 | 0.8 | 0 | 1.5 |

The invention is hereby claimed as follows:

1. A process for breaking emulsions of the water-in-oil type which comprises subjecting the emulsion to the action of a dicarboxylic acid mixed ester in which the ester components consist of (a) an oxyalkylated organic-solvent-soluble phenol-formaldehyde condensation product having 4–15 phenolic nuclei, said phenol being a monoalkyl phenol with a 5–15 carbon alkyl group, the weight ratio of alkylene oxide to condensation product falling between about 1:2 and 9:1, respectively, the phenol-formaldehyde condensation product being oxyalkylated with ethylene oxide and propylene oxide, the ratio of propylene oxide to ethylene oxide being at least 1:4, respectively, and (b) polyoxyalkylene glycol having a molecular weight of at least 1200, said glycol selected from the group consisting of polyoxypropylene glycol and oxyethylene, oxypropylene glycol in a weight ratio of oxyethylene to oxypropylene not exceeding 4:1, the weight ratio of oxyalkylated condensation product to polyoxyalkylene glycol being between 1:4 and 4:1, and (c) an organic, dicarboxy acid, the esterified carboxyl groups of the dicarboxy acid nuclei of said ester being esterified with both components (a) and (b), the mol ratio in said ester of said dicarboxy acid to the total mols of (a) and (b) being in the range of 1–2:1, respectively, and said ester further having a water-solubility of not more than two parts by weight per 100 parts of distilled water at equilibrium at 70° F.

2. A process for breaking emulsions of the water-in-oil type which comprises subjecting the emulsion to the action of a dicarboxylic acid mixed ester in which the ester components consist of (a) an oxyalkylated organic-solvent-soluble monoalkyl phenol-formaldehyde condensation product having 4–15 phenolic nuclei, the alkyl group of said phenol having between 4 and 15 carbons inclusive, the weight ratio of alkylene oxide to condensation product falling between about 1:2 and 15:1 respectively, the phenol-formaldehyde condensation product being oxyalkylated with ethylene oxide and propylene oxide, the ratio of propylene oxide to ethylene oxide being 1:4 to 25:1, respectively, and (b) polyoxyalkylene glycol having a molecular weight of at least 1200, said glycol selected from the group consisting of polyoxypropylene glycol and oxyethylene, oxypropylene glycol in a weight ratio of oxyethylene to oxypropylene not exceeding 4:1, the weight ratio of oxyalklated condensation product to polyoxyalkylene glycol being between 1:5 and 5:1, and (c) an organic, dicarboxy acid, the esterified carboxyl groups of the dicarboxy acid nuclei of said ester being esterified with both components (a) and (b), the mol ratio in said ester of said dicarboxy acid to the total mols of (a) and (b) being in the range of 1-2:1, respectively, and said ester further having a water-solubility of not more than two parts by weight per 100 parts of distilled water at equilibrium at 70° F.

3. A process for breaking emulsions of the water-in-oil type which comprises subjecting the emulsion to the action of a water insoluble, dicarboxylic acid mixed ester in which the ester components consist of (a) an oxyalkylated organic-solvent-soluble alkyl phenol-formaldehyde condensation product having 4–15 phenolic nuclei, said alkyl phenol being primarily a monoalkyl phenol containing not greater than about 25% dialkyl phenol, the alkyl group having between 4 and 15 carbons inclusive, the weight ratio of alkylene oxide to condensation product falling between about 1:2 and 15:1, respectively, the phenol-formaldehyde condensation product being oxyalkylated with ethylene oxide and propylene oxide, the ratio of propylene oxide to ethylene oxide being 1:4 to 25:1, respectively, and (b) a polyoxyalkylene glycol having a molecular weight of at least 1200, said glycol selected from the group consisting of polyoxypropylene glycol and oxyethylene, oxypropylene glycol in a weight ratio of ethylene oxide to propylene oxide not exceeding 4:1, the weight-ratio of oxyalkylated condensation product to polyoxyalkylene glycol being between about 1:5 and 5:1, and (c) an organic, dicarboxy acid, the esterified carboxyl groups of the dicarboxy acid nuclei of said ester being esterified with both components (a) and (b), the mol ratio in said ester of said dicarboxy acid to the total mols of (a) and (b) being in the range of 1-2:1, respectively, and said ester further having a water-solubility of not more than two parts by weight per 100 parts of distilled water at equilibrium at 70° F.

4. A process for breaking emulsions of the water-in-oil type which comprises subjecting the emulsion to the action of a water insoluble, dicarboxylic acid mixed ester in which the ester components consist of (a) an oxyalkylated organic-solvent-soluble alkyl phenol-formaldehyde condensation product having 4–15 phenolic nuclei, said phenol being primarily a monoalkyl phenol, the alkyl group having between 4 and 15 carbons inclusive, the weight ratio of alkylene oxide to condensation product falling between about 1:2 and 15:1, respectively, the phenol-formaldehyde condensation product being oxyalkylated with ethylene oxide and propylene oxide, the ratio of propylene oxide to ethylene oxide being 1:4 to 25:1, respectively, and (b) polyoxypropylene glycol having a molecular weight of at least 1200, the weight ratio of oxyalkylated condensation product to polyoxypropylene glycol being between about 1:5 and 5:1, and (c) an organic, dicarboxy acid, the esterified carboxyl groups of the dicarboxy acid nuclei of said ester being esterified with both components (a) and (b), the mol ratio in said ester of said dicarboxy acid to the total mols of (a) and (b) being in the range of 1-2:1, respectively, and said ester further having a water-solubility of not more than two parts by weight per 100 parts of distilled water at equilibrium at 70° F.

5. A process for breaking emulsions of the water-in-oil type which comprises subjecting the emulsion to the action of a water insoluble, dicarboxylic acid mixed ester in which the ester components consist of (a) an oxyalkylated organic-solvent-soluble alkyl phenol-formaldehyde condensation product having 4–15 phenolic nuclei, said alkyl phenol being primarily a monoalkyl phenol, the alkyl group having between 4 and 15 carbons inclusive, the weight ratio of alkylene oxide to condensation product falling between about 1:2 and 15:1, respectively, the phenol-formaldehyde condensation product being oxyalkylated with ethylene oxide and propylene oxide, the ratio of propylene oxide to ethylene oxide being 1:4 to 25:1, respectively, and (b) a polyoxyalkylene glycol comprising oxyethylene, oxypropylene glycol in a ratio of oxyethylene to oxypropylene not exceeding 4:1, the weight ratio of oxyalkylated condensation product to polyoxyalkylene glycol being between about 1:5 and 5:1, and (c) an organic, dicarboxy acid, the esterified carboxyl groups of the dicarboxy acid nuclei of said ester being esterified with both components (a) and (b), the mol ratio in said ester of said dicarboxy acid to the total mols of (a) and (b) being in the range of 1-2:1, respectively, and said ester further having a water-solubility of not more than two parts by weight per 100 parts of distilled water at equilibrium at 70° F.

6. The process of claim 2 wherein said dicarboxy acid is diglycolic acid.

7. The process of claim 2 wherein said dicarboxy acid is maleic acid.

8. The process of claim 2 wherein said dicarboxy acid is phthalic acid.

References Cited by the Examiner

UNITED STATES PATENTS

| | | | |
|---|---|---|---|
| 2,454,544 | 11/48 | Bock et al. | 260—53 |
| 2,454,545 | 11/48 | Bock et al. | 260—342 |
| 2,541,999 | 2/51 | De Groote et al. | 252—342 |
| 2,766,213 | 10/56 | Dickson | 252—342 |
| 2,841,563 | 7/58 | Kirkpatrick et al. | 252—342 |

JULIUS GREENWALD, *Primary Examiner.*

UNITED STATES PATENT OFFICE
CERTIFICATE OF CORRECTION

Patent No. 3,202,615                                                 August 24, 1965

Willard H. Kirkpatrick et al.

It is hereby certified that error appears in the above numbered patent requiring correction and that the said Letters Patent should read as corrected below.

In the grant, lines 2 and 3, and line 13, and in the heading to the printed specification, line 5, name of assignee, for "Valco Chemical Company", each occurrence, read -- Nalco Chemical Company --.

Signed and sealed this 20th day of September 1966.

(SEAL)
Attest:

ERNEST W. SWIDER                                       EDWARD J. BRENNER
Attesting Officer                                           Commissioner of Patents